US008655719B1

United States Patent
Li et al.

(10) Patent No.: US 8,655,719 B1
(45) Date of Patent: Feb. 18, 2014

(54) MEDIATING CUSTOMER-DRIVEN EXCHANGE OF ACCESS TO PERSONAL DATA FOR PERSONALIZED MERCHANT OFFERS

(75) Inventors: Jun Li, Mountain View, CA (US); Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1815 days.

(21) Appl. No.: 11/828,090

(22) Filed: Jul. 25, 2007

(51) Int. Cl.
*G06Q 30/00* (2012.01)

(52) U.S. Cl.
USPC .................. 705/14.1; 705/14.25; 705/14.35; 705/14.54

(58) Field of Classification Search
USPC .................. 705/14, 14.1, 14.25, 14.35, 14.54
See application file for complete search history.

(56) References Cited

U.S. PATENT DOCUMENTS

| | | | |
|---|---|---|---|
| 5,592,560 A | 1/1997 | Deaton et al. | |
| 5,794,207 A | 8/1998 | Walker et al. | |
| 6,026,370 A | 2/2000 | Jermyn | |
| 6,026,376 A | 2/2000 | Kenney | |
| 6,041,308 A | 3/2000 | Walker et al. | |
| 6,185,541 B1 | 2/2001 | Scroggie et al. | |
| 6,275,824 B1 | 8/2001 | O'Flaherty et al. | |
| 6,298,348 B1 | 10/2001 | Eldering | |
| 6,938,022 B1 | 8/2005 | Singhal | |
| 7,062,510 B1 | 6/2006 | Eldering | |
| 7,113,917 B2 | 9/2006 | Jacobi et al. | |
| 7,130,815 B1 | 10/2006 | Gupta | |
| 7,167,842 B1 | 1/2007 | Josephson, II et al. | |
| 7,216,092 B1 | 5/2007 | Weber et al. | |
| 2001/0011247 A1 | 8/2001 | O'Flaherty et al. | |
| 2002/0072975 A1* | 6/2002 | Steele et al. | 705/14 |
| 2002/0147645 A1 | 10/2002 | Alao et al. | |
| 2004/0002878 A1* | 1/2004 | Maria Hinton | 705/7 |
| 2004/0139319 A1 | 7/2004 | Favazza et al. | |
| 2004/0176104 A1* | 9/2004 | Arcens | 455/456.3 |
| 2005/0097060 A1 | 5/2005 | Lee et al. | |
| 2005/0261987 A1* | 11/2005 | Bezos et al. | 705/27 |
| 2006/0095327 A1 | 5/2006 | Vaughn et al. | |
| 2006/0248592 A1 | 11/2006 | Agrawal et al. | |

* cited by examiner

*Primary Examiner* — Michael Bekerman
*Assistant Examiner* — Mario Iosif

(57) ABSTRACT

A purchase objective is received from a customer. A merchant is notified of the purchase objective. One or more queries for personal information associated with the customer are received from the merchant. Ones of the received queries that are associated with the purchase objective are validated. For each of the validated queries, information matching the query is retrieved from personal data relating to the customer subject to data access restrictions specified by a privacy policy established by the customer, and the retrieved information is transmitted to the merchant. An offer that satisfies the purchase objective is received from the merchant. The offer is presented to the customer.

13 Claims, 9 Drawing Sheets

| Customer Session ID | Personal Data Table | Access Entries in Table | Access Restriction Condition/Action | Merchant-Specific Access Restriction |
|---|---|---|---|---|
| 87E10D31 | LoyaltyCard | LoyaltyCard.CardID | Allowed | |
| 87E10D31 | Address | Address.Zip | Transform (Address.Zip) | Allowed when MerchantID= 100AC731 |
| 87E10D31 | PurchaseHistory | Sum (PurchaseHistory.Price) | Allowed with (Date() > 7/11/2005 and Date() < 7/11/2007) and (PurchaseHistory.Category = Travel) | |
| 87E10D31 | PurchaseHistory | PurchaseHistory.Price | Blocked | Allowed when MerchantID= 100AC731 |
| ... | ... | ... | ... | ... |

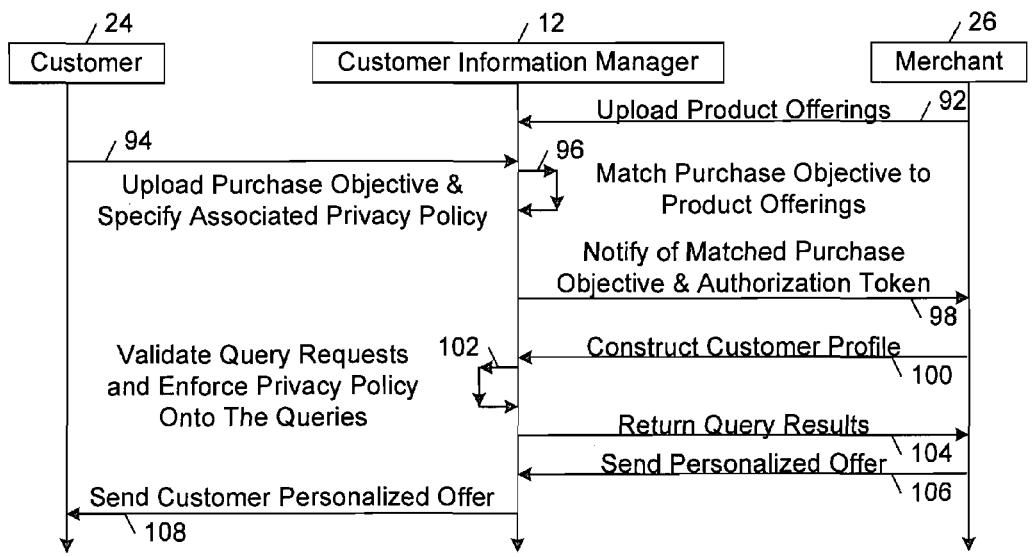

MEDIATING CUSTOMER-DRIVEN EXCHANGE OF ACCESS TO PERSONAL DATA FOR PERSONALIZED MERCHANT OFFERS

BACKGROUND

Many merchants distribute to customers various promotions that are designed to encourage the customers to purchase the merchants' goods and services. These promotions typically take the form of discount coupons, advertising, recommendations, and other purchasing incentives for various merchant offerings. Promotions, such as discount coupons, oftentimes are delivered to customers in their homes via mass mailings, in stores via kiosks and check-out stands, and on a computer via online browsing or online shopping.

In order to reduce costs and avoid annoying customers with promotions that do not meet their interests, merchants strive to target their promotions in ways that will be best received by customers. To this end, great efforts have been made to develop profiles that reveal the most effective ways to stimulate customers to purchase merchant offerings. Various customer profiling techniques have been developed. These techniques typically use information about a customer, such as demographics information and purchase history information, to build a model that reveals the customer's particular tastes and interests. Developing an accurate profile of a customer, however, is difficult.

One of the main challenges inhibiting the development of an accurate customer profile is the inability to access sufficient information about the customer. Oftentimes it is difficult to obtain accurate demographic information and to obtain a comprehensive set of purchase history data. Even assuming that the customer uses a common identifier (e.g., a loyalty card) for all his or her purchases, these purchases typically are tracked only by the merchant that issued the identifier to the customer. In addition, although consumers typically prefer to receive targeted promotions that match their interests instead or undifferentiated promotions, consumers typically are reluctant to allow indiscriminate access to their personal demographic data and purchase records.

What are needed are improved systems and methods for delivering targeted promotions to customers.

SUMMARY

In one aspect, the invention features a method in accordance with which a purchase objective is received from a customer. A merchant is notified of the purchase objective. One or more queries for personal information associated with the customer are received from the merchant. Ones of the received queries that are associated with the purchase objective are validated. For each of the validated queries, information matching the query is retrieved from personal data relating to the customer subject to data access restrictions specified by a privacy policy established by the customer, and the retrieved information is transmitted to the merchant. An offer that satisfies the purchase objective is received from the merchant. The offer is presented to the customer.

The invention also features apparatus and machine readable media storing machine-readable instructions for implementing the method described above.

Other features and advantages of the invention will become apparent from the following description, including the drawings and the claims.

DESCRIPTION OF DRAWINGS

FIG. 7 is a diagrammatic view of an embodiment of a table for storing a customer's product-category-specific privacy policy.

FIG. 8 is a flow diagram that shows activities of the customer, an embodiment of the customer information manager of FIG. 1, and the merchant in accordance with an exemplary customer-driven exchange of access to personal data for personalized merchant promotional offers.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail herein are capable of mediating customer-driven exchange of access to personal data for personalized merchant promotional offers. In particular, these embodiments allow customers to solicit targeted promotional offers from merchants that meet their purchase objectives in exchange for allowing merchants to access their personal data in accordance with a privacy policy specified by the customer. Depending on the specified privacy policy, merchant access to a customer's personal data can be controlled in a way that protects the privacy of the customer. Some embodiments establish a customer-merchant session during which a customer and a merchant are able to negotiate by means of dynamic adjustments of the customer's privacy policy and dynamic adjustments of the terms of the merchant's promotional offer. In this way, customers can trade selective, controlled access to their personal data, which may include purchase history data that spans transactions with multiple vendors, for targeted and potentially higher-valued promotional offers. At the same time, merchants can provide highly targeted promotional offers to customers that have an interest in purchasing their offerings.

II. Overview

Figure 1:
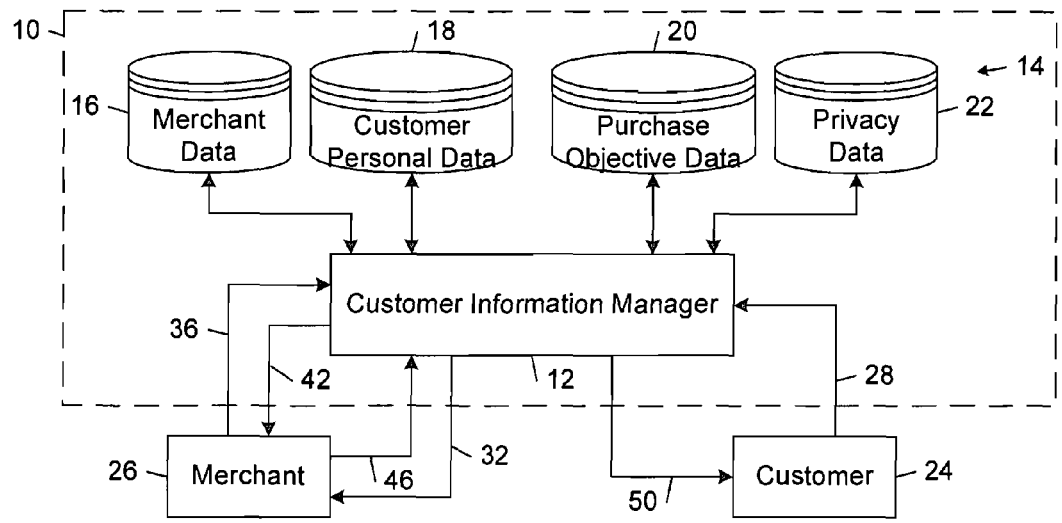
FIG. 1 is a block diagram of an embodiment of a customer information management system that includes a data store and a customer information manager that mediates interactions between a merchant and a customer.

FIG. 1 shows an embodiment of a customer information management system 10 that includes a customer information manager 12 and a data store 14 that includes merchant data 16, customer personal data 18, purchase objective data 20, and privacy data 22. The customer information manager 12 enables a customer 24 to allow a merchant 26 to selectively access to the customer's personal data 18 in exchange for a personalized promotional offer.

Figure 2:
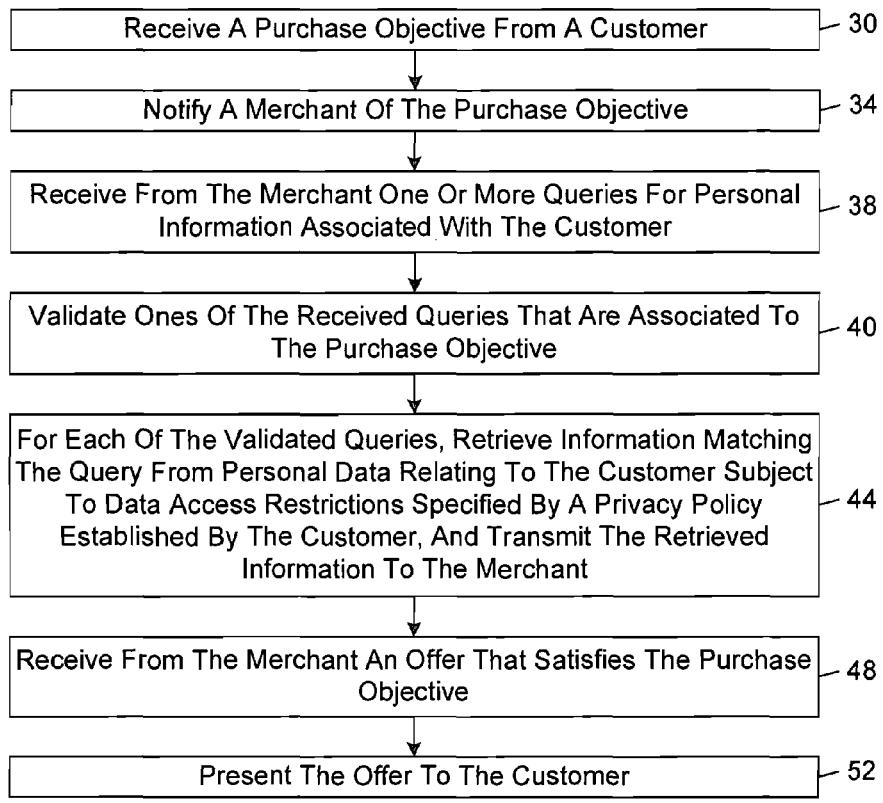
FIG. 2 is a flow diagram of an embodiment of a method that is implemented by an embodiment of the customer information manager of FIG. 1.

FIG. 2 shows an embodiment of a mediation method that is implemented by the customer information manager 12 to enable a customer driven exchange of access to personal data for personalized promotional offers.

The customer information manager 12 receives a purchase objective 28 from the customer 24 (FIG. 2, block 30). The customer information manager 12 stores the data specifying the purchase objective 28 in the purchase objective data store 20. A customer session starts when the customer 24 expresses the purchase objective 28 to the customer information manager 12, and terminates when the purchase objective is expired after a customer-defined time, or the customer 24 withdraws the purchase objective 28 from the customer information manager 12 before the customer-defined time. The customer information manager 12 assigns a unique customer session identifier to represent the customer session; the purchase objective 28 is uniquely referenced by this customer session identifier. The customer information manager 12 notifies 32 the merchant 26 of the purchase objective 28 (FIG. 2, block 34). In some embodiments, the customer information manager 12 may notify the merchant 26 of the purchase objective 28 in response to a determination that the merchant 26 has one or more product offerings that potentially could satisfy the purchase objective. In other embodiments, the customer information manager 12 may post the purchase offer to the merchant 28 in the form of a reverse advertisement.

A customer-merchant session starts when the merchant 26 receives the purchase objective 28 of the customer 24, and expresses an interest to provide a personalized offer to the customer 24, based on the customer profile constructed via one or more queries 36 for personal information associated with the customer 24. The customer-merchant session typically ends when the customer 24 either accepts or rejects the offer from the merchant 26, or when the customer-merchant session times out. The customer information manager 12 assigns a unique customer-merchant session identifier to uniquely represent the customer-merchant session. In one embodiment, the customer-merchant session identifier can be formed by concatenating the customer session identifier with the merchant's identifier.

The customer information manager 12 receives from the merchant 26 one or more queries 36 for personal information associated with the customer 24 (FIG. 2, block 38). The customer information manager 12 validates the received queries that come with the valid authorization token associated with the customer-merchant session. For each of the validated queries, the customer information manager 12 retrieves information matching the query from personal data 18 relating to the customer 24 subject to data access restrictions specified by a privacy policy established by the customer 24, and transmits 42 the retrieved information to the merchant 26 (FIG. 2, block 44). The customer information manager 12 typically notifies the merchant 26 of any invalidated queries. In some embodiments, the customer information manager 12 may invalidate queries that do not come with a valid authorization token that is associated with the customer-merchant session.

The customer information manager 12 receives from the merchant 26 an offer 46 that satisfies the purchase objective (FIG. 2, block 48). The customer information manager 12 presents the offer 50 to the customer 24 (FIG. 2, block 52). The customer information manager 12 may facilitate the completion of the purchase transaction by providing ways for the customer 24 to execute the merchant's offer. For example, the customer information manager 12 may allow the customer to print out a copy of the promotional offer that can be used to make an in-store purchase at the merchant's retail establishment. Alternatively, the customer information manager 12 may allow the customer 24 to transmit the pertinent information needed to execute the promotional offer to the merchant's online store.

III. Exemplary Architecture of the Customer Information Management System

Embodiments of the customer information manager 12 may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the methods that are executed by the embodiments of the customer information manager 12, as well as the data they generate, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the customer information manager 12 may be implemented in any one of a wide variety of electronic devices, including desktop computers, workstation computers, and server computers.

Figure 3:
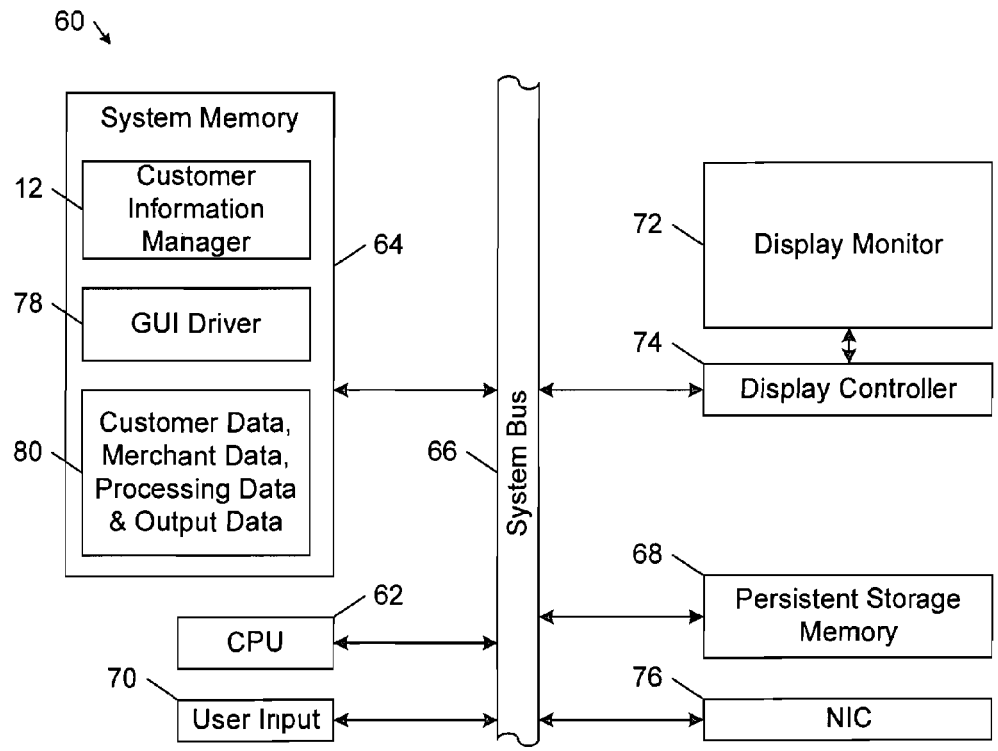
FIG. 3 is a block diagram of an embodiment of a computer system that implements an embodiment of the customer information manager of FIG. 1.

FIG. 3 shows an embodiment of a computer system 60 that can implement to any of the embodiments of the image processing system 10 that are described herein. The computer system 60 includes a processing unit 62 (CPU), a system memory 64, and a system bus 66 that couples processing unit 62 to the various components of the computer system 60. The processing unit 62 typically includes one or more processors, each of which may be in the form of any one of various commercially available processors. The system memory 64 typically includes a read only memory (ROM) that stores a basic input/output system (BIOS) that contains start-up routines for the computer system 60 and a random access memory (RAM). The system bus 66 may be a memory bus, a peripheral bus or a local bus, and may be compatible with any of a variety of bus protocols, including PCI, VESA, Microchannel, ISA, and EISA. The computer system 60 also includes a persistent storage memory 68 (e.g., a hard drive, a floppy drive, a CD ROM drive, magnetic tape drives, flash memory devices, and digital video disks) that is connected to the system bus 66 and contains one or more computer-readable media disks that provide non-volatile or persistent storage for data, data structures and computer-executable instructions.

A user may interact (e.g., enter commands or data) with the computer 60 using one or more input devices 70 (e.g., a keyboard, a computer mouse, a microphone, joystick, and touch pad). Information may be presented through a graphical user interface (GUI) that is displayed to the user on a display monitor 72, which is controlled by a display controller 74. The computer system 60 also typically includes peripheral output devices, such as speakers and a printer. One or more remote computers may be connected to the computer system 60 through a network interface card (NIC) 76.

As shown in FIG. 3, the system memory 64 also stores the customer information manager 12, a GUI driver 78, and at least one database 80 containing retrieved customer data, retrieved merchant data, intermediate processing data, and output data. In some embodiments, the customer information manager 12 interfaces with the GUI driver 78 and the user input 70 to present a user interface for managing and controlling the operation of the customer information manager 12.

Figure 4:
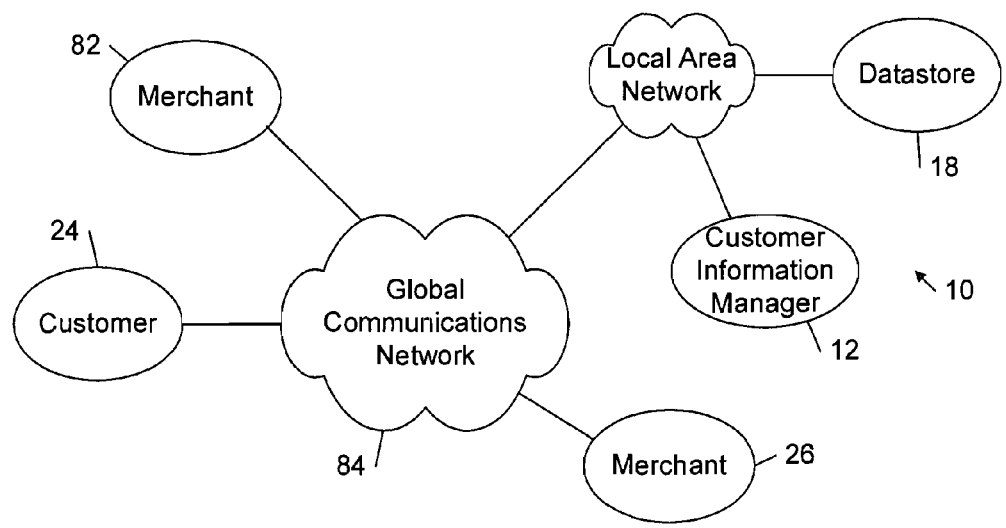
FIG. 4 is a diagrammatic view of an embodiment of a communications network over which an embodiment of the customer information manager of FIG. 1 mediates the exchange of information between customers and merchants.

Referring to FIG. 4, in one embodiment, the customer information manager 12 may provide mediation services to the customer 24 and one or more merchants 26, 82 over a global communication network 84. The global communication network 84 may include a number of different computing platforms and transport facilities, including a voice network, a wireless network, and a computer network. Service requests may be transmitted, and service replies may be presented in a number of different media formats, such as voice, internet, e-mail and wireless formats. In this way, the customer 24 and the merchants 26, 82 may access the services provided by the customer information manager 12 using any one of a wide variety of different communication devices. For example, in one illustrative implementation, a wireless device (e.g., a mobile telephone or a personal digital assistant (PDA)) may connect to the customer information manager 12 over a wireless network. Communications from the wireless device may be in accordance with the Wireless Application Protocol (WAP). A wireless gateway converts the WAP communications into HTTP messages that may be processed by customer information manager 12. In another illustrative implementation, a voice device (e.g., a conventional telephone) may connect to the customer information manager 12 over a voice network. Communications from the voice device may be in the form of conventional analog or digital audio signals, or they may be formatted as VoxML messages. A voice gateway may use speech-to-text technology to convert the audio signals into HTTP messages; VoxML messages may be converted to HTTP messages based upon an extensible style language (XSL) style specification. The voice gateway also may be configured to receive from the customer information manager 12 real time audio messages that may be passed directly to the voice device. Alternatively, the customer information manager 12 may transmit formatted messages (e.g., VoxML, XML, WML, e-mail) that must be converted to a real time audio format (e.g., using text-to-speech technology) before the messages may be passed to the voice device. In a third illustrative implementation, a software program operating at a client personal computer (PC) may access the services of the customer information manager 12 over the internet.

IV. Data Store

As explained above in connection with FIG. 1, the data store 14 includes merchant data 16, customer personal data 18, purchase objective data 20, and privacy data 22.

Figure 5:
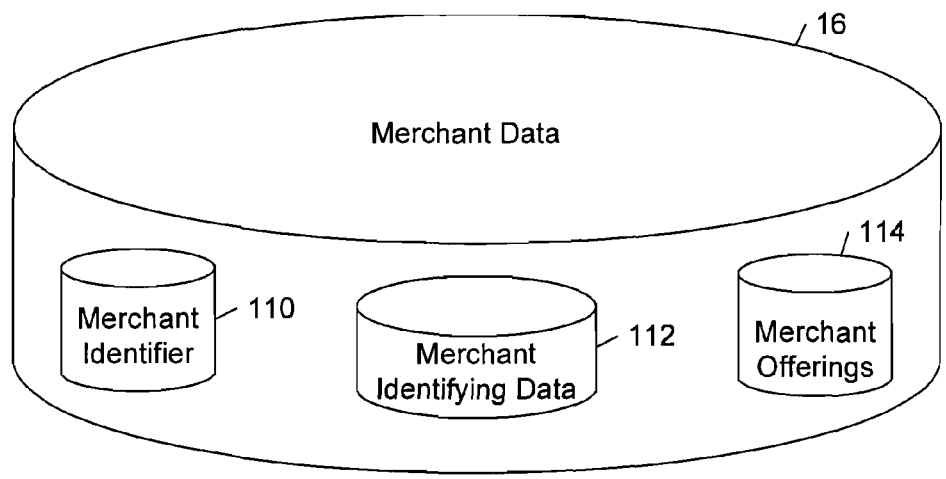
FIG. 5 is a diagrammatic view of an embodiment of a data store containing various types of merchant data.

FIG. 5 shows an embodiment of the merchant data store 16 that includes a merchant identifier 110, merchant identifying data 112, and merchant offerings 114. The merchant identifier 110 is a number that uniquely identifies the merchant 26. The customer information manager 12 typically assigns the merchant identifier 110 to the merchant 26 after the merchant 26 has registered with the customer information management system 10. The merchant identifying data 112 typically includes one or more of the name, address, phone number, facsimile number, web page, electronic mail address, and web service end-point references (for automatic business-to-business transactions) of the merchant 26. The merchant offerings data 114 includes data describing the offering that the merchant 26 has uploaded to the customer information manager 12.

Figure 6:
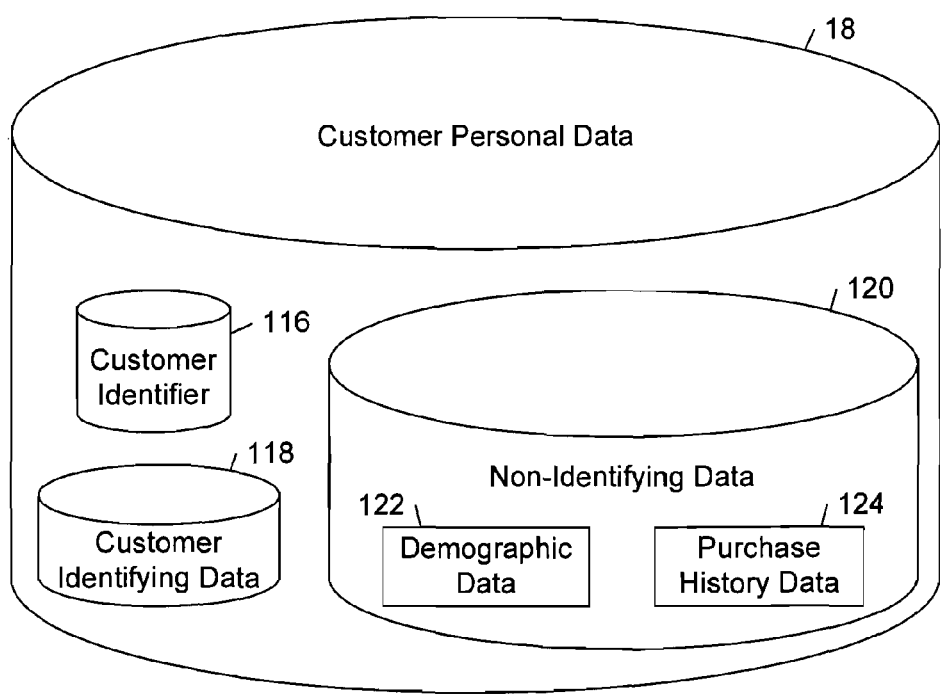
FIG. 6 is a diagrammatic view of an embodiment of a data store containing various types of customer personal data.

FIG. 6 shows an embodiment of the customer personal data store 18 that includes a customer identifier 116, customer identifying data 118, and non-identifying data 120. The customer identifier 116 is a number that uniquely identifies the customer 24. The customer information manager 12 typically assigns the customer identifier 116 to the customer 24 after the customer 24 has registered with the customer information management system 10. The customer identifying data 118 consists of information that can be used independently of other data to identify the customer 24. Examples of such identifying information include the name, address, phone number, facsimile number, electronic mail address, social security number, credit card number, driver license number, and loyalty card number of the customer 24. The non-identifying data 120 consists of information that cannot be used independently of other data to identify the customer 24. Examples of such identifying information include demographic data 122 (e.g., age, gender, height, weight, body dimensions, income level, residential status, ethnic background, marital status, parental status, and language preference) and purchase history data 124 (e.g., purchase records, number of purchases from a company within a specific period of time, click through events to links within a website, recency and frequency of visits to a store or website, and a measure of the monetary responsiveness to past marketing solicitations). The purchase history data may be obtained from the customer or from other sources. The purchase history data typically will include historical data relating to prior purchases by the customer from different merchants. The customer information manager 12 warehouses the purchase history data in the customer personal data store 18. In this way, the customer information manager 12 can provide the merchants that are notified of the purchase objective access to all the historical data of purchases from multiple merchants subject to the data access restrictions specified by the privacy policy associated with the purchase objective.

The purchase objective data store 20 (see FIG. 1) contains descriptions of the purchase objectives that have been specified by the customer 24.

The privacy data store 22 (see FIG. 1) contains both default privacy policies and custom privacy policies that have been specified by the customer 24. In some embodiments, each product and service category (alternatively referred to herein as "purchase objective category") is associated with a respective default privacy policy. In these embodiments, the customer 24 may set the privacy policy of the specified purchase objective to the default privacy policy for the product category or service category into which the purchase objective is classified; alternatively, the customer 24 may customize the default privacy policy by opting-into or opting-out of one or more of the access restrictions specified in the corresponding default product/service-category-specific privacy policy. In some embodiments, the customer information manager 12 classifies the purchase objective into a purchase category selected from a set of predetermined purchase categories, matches the selected purchase category to one of a set of purchase-category-specific privacy policies, and prompts the customer 24 to establish a privacy policy for the purchase objective based on the matched purchase-category-specific privacy policy. The purchase-category-specific privacy policies may correspond to the default privacy policies, custom privacy policies, or a combination of both default and custom privacy policies. The customer 24 may establish the privacy policy for the purchase objective either by selecting the presented purchase-category-specific privacy policy in its current form or by customizing the presented purchase-category-specific privacy policy.

FIG. 7 shows an embodiment of a database table 138 that may be used to store privacy policies in the privacy data store 22. The database table 138 contains a specification of a privacy policy set for a specific purchase objective category associated with a particular customer session, which can be uniquely identified by the customer session identifier. All the customer-merchant sessions that are derived from the same customer session will have their access to the privacy data store 22 governed by the same privacy policy set. Each row of the database table 138 specifies a respective privacy policy that is associated with a particular customer's purchase objective, which is associated with the customer session identifier 87E10D31. There can be more than one privacy policy specification associated with the customer session identifier. The database table 138 consists of multiple columns. The column "Customer session id" contains the actual customer session id that is associated with the purchase objective of the customer. The column "Personal Data Table" specifies the name of the personal data table that is involved in this policy specification. The column "Access Entities in Table" specifies the names of the columns on the personal data table that will be considered for access restriction. The column "Access Restriction Condition/Action" specifies the conditions on which the access of the columns in the personal data table is allowed or disallowed, and some data transformation related actions that are required before the query processing result is returned (e.g., instead of returning the exact zip code of 94304, it returns 94*). The column "Merchant-Specific Access Restriction" contains any merchant specific access restriction condition or action that the customer 24 has specified for each policy. This column may be used, for example, to grant a particular set of merchants greater access to the corresponding personal information specified in the "Access Entities in Table." For example, the entry in the fourth row, last column of the exemplary database table 138 will grant the merchant with merchant id 100AC731 access to the customer's purchase price for all the purchases the customer has made; other merchants, on the other hand, will only have access to the total amount of the customer's purchases in the category of travel within a particular time period, as specified in the third row, fourth column of the database table 138**. Each merchant-specific access restriction is associated with one or more merchant identifiers. The mapping between the merchant's common name and the merchant ID is provided by the customer information manager.

Examples of the types of data access restrictions parameters that may be specified into the database table 138 include opt-ins and opt-outs for disclosure of identifying data (e.g., loyalty card identifier, zip code), disclosure of non-identifying data, and disclosure of purchase history data (e.g., the sum of the total spending in travel for the last one year). The values in the columns in the database 138 may be specified for the various types of personal data that have been determined to be relevant to the specific purchase objective category. In this way, the rows that share the same customer session identifier in the database table 138 control the level of privacy that will be applied by the customer information manager 12 to merchant queries in relation to the associated purchase objective. In some embodiments, the columns in the database table 138 are populated from a default set of access restriction parameter values that control the way in which the customer information manager 12 processes the incoming query requests from the merchant. The customer 24 typically is allowed to customize the privacy policy for each purchase objective by changing the default values in one or more of the columns.

V. Mediating Customer-Driven Exchange of Access to Personal Data for Personalized Merchant Offers A. Exemplary Interactions Among the Customer, the Customer Information Manager, and the Merchant FIG. 8 shows exemplary interactions among the customer 24, the customer information manager 12, and the merchant 26 in an exemplary model of a customer-driven exchange of access to personal data for personalized merchant offers.

The merchant 26 uploads a list of its product offerings (FIG. 8, line 92). The list typically includes descriptions of the products or services which the merchant would like to offer targeted promotions. The merchant 26 typically does not upload prices for the listed goods or services, as the final prices will be determined after the merchant 26 has determined the targeted promotions that will be offered to the customer 24.

The customer 24 uploads a purchase objective and specifies a privacy policy for the purchase objective (FIG. 8, line 94). The purchase objective typically includes a description of the product or service for which the customer 24 would like to purchase, as well as a specification of the terms or conditions that the customer would like to see associated with any promotional offer presented in satisfaction of the purchase objective. The privacy policy specifies the restrictions on the types of data that can be revealed to the merchant in response to the merchant's query requests.

After receiving the purchase objective and the associated privacy policy from the customer (FIG. 8, line 94), the customer information manager 12 matches the purchase objective to the uploaded list of merchant offerings (FIG. 5, line 96). In some embodiments, the customer information manager 12 notifies the merchant 26 of the purchase objective, and the merchant 26 searches for ones of its offerings that match the purchase objective. In some other embodiments, the customer information manager 12 matches the list of merchant offerings to customer purchase objectives.

In response to a determination that one or more of the merchant offerings match the purchase objective, the customer information manager 12 sends the merchant a notification of the matched purchase objective along with an authorization token (FIG. 8, line 98). Each customer-merchant session is associated with a unique authorization token. The authorization token will be used by the customer information manager 12 to authorize the merchant's access to the customer information manager 12. In some embodiments, the customer information manager 12 also uses the authorization token to establish a finite customer-merchant session time period during which the merchant's requests to query the customer's personal data in connection with the particular purchase objective must be received in order to be declared as valid by the customer information manager 12.

Before generating a personalized promotional offer in response to the customer's published purchase objective, the merchant 26 typically constructs a customer profile (FIG. 8, line 100). In this process, the merchant 26 typically submits a series of requests to query the personal data associated with the customer 24. The customer information manager 12 validates the query requests and enforces the privacy policy associated with the purchase objective onto the queries contained in the query requests (FIG. 8, line 102). In some embodiments, the customer information manager 12 validates the query requests based on copies of the authorization token that the merchant 26 sends with the query requests. In the process of enforcing the associated privacy policy, the customer information manager 12 may perform query rewriting and possibly input/output filtering or other transformations on the queries and the retrieved customer data. The customer information manager 12 returns the query results to the merchant 26 (FIG. 8, line 104).

After constructing a profile of the customer (FIG. 8, line 100), the merchant 26 may send a personalized promotional offer to the customer information manager 12 (FIG. 8, line 106). The promotional offer may be, for example, in the form of a discount coupon or other purchase incentive. If the promotional offer satisfies the terms and conditions of the specified purchase objective, the customer information manager 12 presents the personalized promotional offer to the customer 24 for consideration (FIG. 8, line 108).

Figure 9:
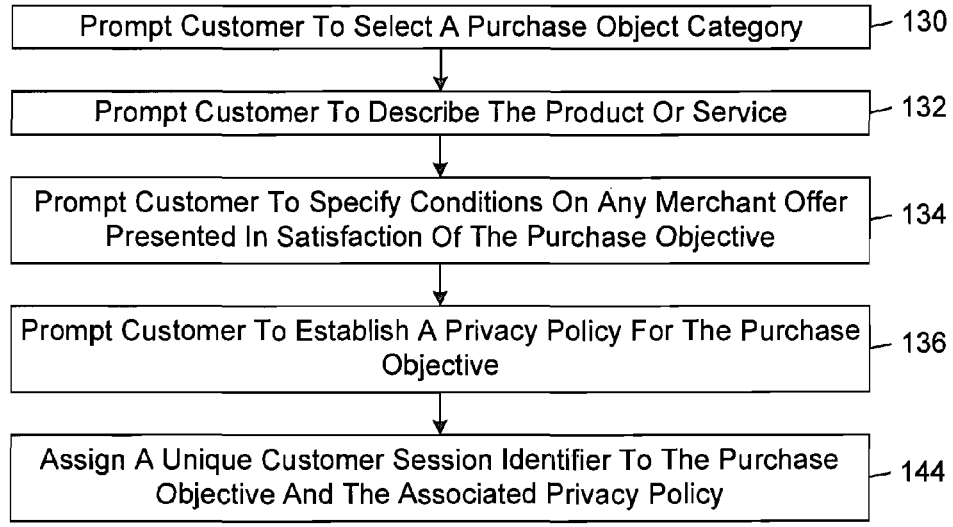
FIG. 9 is a flow diagram of an embodiment of a method that is implemented by an embodiment of the customer information manager of FIG. 1 in receiving a purchase objective from a customer.

B. Receiving a Purchase Objective and an Associated Privacy Policy from a Customer FIG. 9 shows an embodiment of a method in accordance with which the customer information manager 12 processes a request from the customer 24 to submit a purchase objective. In some embodiments, the customer information manager 12 provides a web application interface through which the customer 24 can specify the purchase objective.

The customer information manager 12 prompts the customer to select a purchase objective category (FIG. 9, block 130). The purchase objective category typically is product category or a service category into which the purchase objective is classified.

The customer information manager 12 also prompts the customer 24 to describe the desired product or service (FIG. 9, block 132). For example, the customer information manager 12 may prompt the customer to select a specific product or service from a dropdown list or the like that is associated with the selected purchase objective category. The customer information manager 12 also may prompt the customer to input constraints on the selected product or service, such as quality or brand constraints and constraints on the technical specifications of the product or service. For example, if the customer wishes to purchase a camera, within a digital camera product category, an exemplary set of product-specific constraints could be "the product brand should be Hewlett-Packard" and "the resolution should be larger than 3M Pixels."

The customer information manager 12 additionally prompts the customer to specify conditions on any merchant offer that is presented in satisfaction of the purchase objective (FIG. 9, block 134). The conditions can include conditions on the time during which the promotional offer will be accepted and conditions on the magnitude of the desired promotion. For example, the customer may specify that the promotional offer should include a "discount greater than 15%."

After the purchase objective has been specified, the customer information manager 12 prompts the customer 24 to establish a privacy policy for the purchase objective (FIG. 9, block 136). As explained above, each product and service category may be associated with a respective default privacy policy. In these embodiments, the customer 24 may set the privacy policy of the specified purchase objective to the default privacy policy for the product category or service category of the purchase objective; alternatively, the customer 24 may customize the default privacy policy by opting-into or opting-out of one or more of the access restrictions specified in the corresponding product/service-category-specific default privacy policy.

The customer information manager 12 assigns a unique customer session identifier to represent a customer session that is associated with the purchase objective and the associated privacy policy (FIG. 9, block 144). A customer session identifier may be generated in a wide variety of different ways, including pseudo-random number generator based methods. The unique customer-merchant session identifier represents the customer-merchant session and the customer-merchant session identifier may be generated in a wide variety of different ways, including the concatenation of the customer session identifier with the merchant's merchant identifier 110.

C. Processing Merchant Offerings and Notifying a Merchant of a Matching Purchase Objective FIG. 10 shows an embodiment of a method that is implemented by the customer information manager 12 in processing merchant offerings and notifying the merchant 26 of a matching purchase objective.

Figure 10:
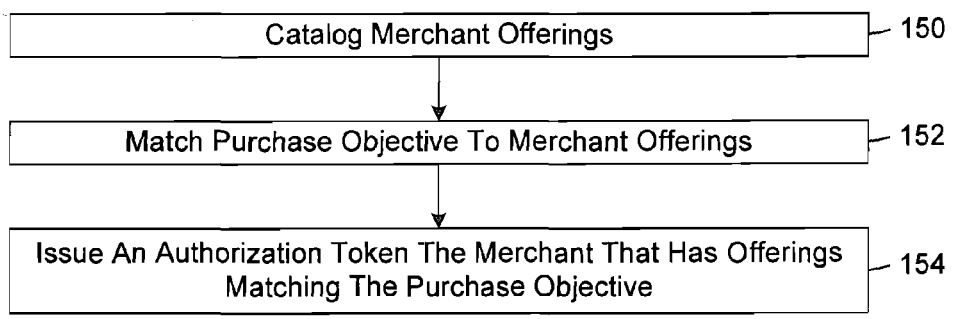
FIG. 10 is a flow diagram of an embodiment of a method that is implemented by an embodiment of the customer information manager of FIG. 1 for notifying a merchant of a customer purchase objective.

In accordance with this method, the customer information manager 12 catalogs the merchant offerings that were uploaded by one or more of the merchants that have registered with the customer information management system 10 (FIG. 10, block 150). The merchant offerings typically are catalogued in accordance with a hierarchical classification system that consists of a set of top level product/service categories, each of which may have one or more levels of sub-categories down to a product or service level sub-category. In this process, each merchant offering typically is classified into one of the top level categories and additionally is classified into the appropriate product or service level sub-category within the selected top level category.

The customer information manager 12 matches the purchase objective that is received from the customer to the catalogued merchant offerings (FIG. 10, block 152). In this process, the customer information manager 12 typically matches the description of the product or service specified in purchase objective to the catalogued merchant offerings in the category/sub-category corresponding to the category of the product or service specified in the purchase objective.

The customer information manager 12 issues a respective authorization token to one merchant that has offerings matching the purchase objective (FIG. 10, line 154). In some embodiments, the customer information manager 12 sends the merchant a message that contains a customer-merchant session identifier that is linked to the customer session identifier. If the customer-merchant session identifier is encrypted, it may be transmitted to the merchant over both encrypted and unencrypted communications channels. If the customer-merchant session identifier is unencrypted, it typically is transmitted to the merchant over an encrypted communications channel.

Different merchants, even though they respond to the same purchase objective, will be issued different respective authorization tokens. At the customer information manager 12, each of the authorization tokens is one-to-one mapped to the customer-merchant session identifier that was assigned to the customer-merchant session to respond to the purchase objective defined in the customer session. In some situations, the customer will receive multiple product offers from different online merchants. In some embodiments, the customer information manager 12 handles these cases by assigning to each merchant a unique customer-merchant session. In some of these embodiments, under this multi-merchant situation, the customer-merchant session identifiers that are bound to the merchants will consist of two sequential parts: the customer session identifier created when the customer publishes its purchase objective, followed by the merchant identifier 110. Each different merchant will receive a distinct customer-merchant session identifier.

In some embodiments, the authorization token is valid during only a finite customer-merchant session time period (e.g., thirty days), after which the merchants' requests to query the customer's personal data in connection with the particular purchase objective will not be accepted by the customer information manager 12. As explained in detail below, in the embodiments shown in FIGS. 10-13, the merchant must transmit a respective copy of the authorization token to the customer information manager 12 with every query request.

D. Processing Query Requests Received from the Merchant

Figure 11:
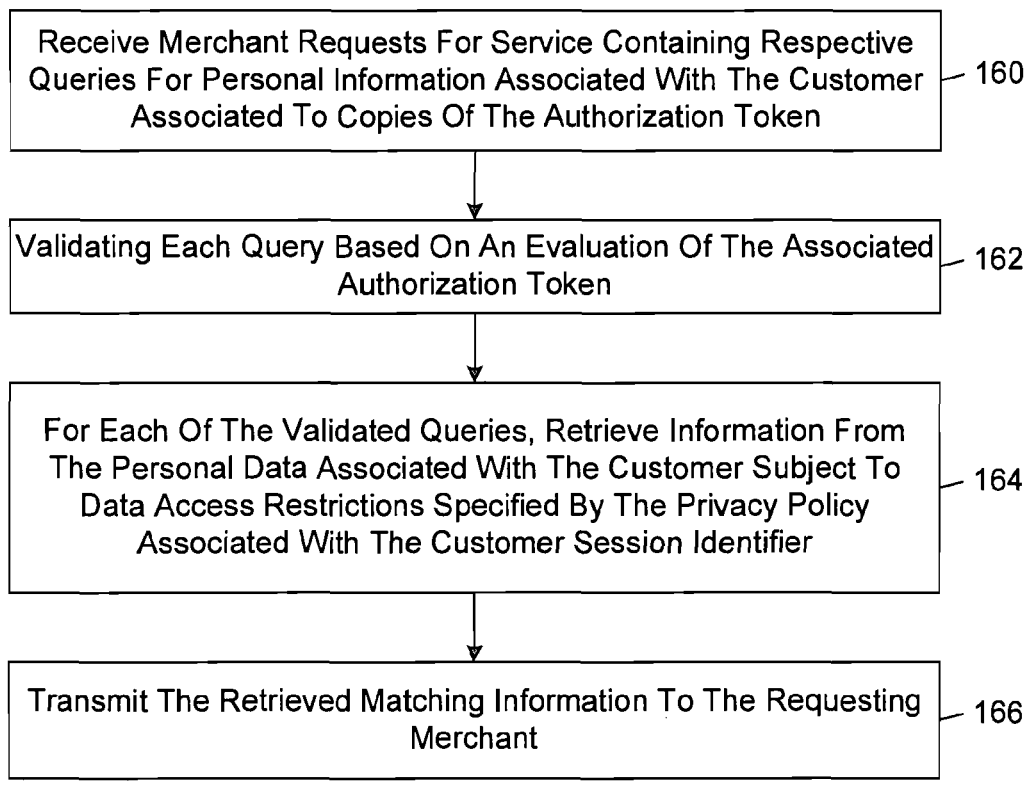
FIG. 11 is a flow diagram of an embodiment of a method that is implemented by an embodiment of the customer information manager of FIG. 1 for providing a merchant with selective access to a customer's personal data.

FIG. 11 shows a method in accordance with which the customer information manager 12 processes query requests that are received from the merchant 26.

The customer information manager 12 receives merchant requests for service containing respective queries for personal information that is associated with the customer who is associated with the copy of the authorization token that is included with each request (FIG. 1, block 160). Each of the requests for service includes a respective authorization token that was issued by the customer information manager 12 to the merchant.

The customer information manager 12 validates each of the received queries based on an evaluation of the associated authorization token (FIG. 11, block 162). In this process, the customer information manager 12 validates the signature of the entire request message from the merchant, which includes the authorization token that is embedded in the request message, and makes sure that the service request is received from the same merchant who was issued the authorization token. The customer information manager 12 also ensures that the authorization token is not expired.

For each of the validated queries, the customer information manager 12 retrieves information from the personal data store that is associated with the customer subject to the data access restrictions that are specified by the privacy policy associated with the customer session identifier (FIG. 11, block 164). The customer-merchant session identifier is derived from the customer session identifier, and is one-to-one mapped to the authorization token and such one-to-one relationship is stored in the customer information manager 12. In this process, the customer information manager 12 takes the authorization token from the merchant's request, and uses this token to find the customer-merchant session identifier, and from this session identifier to retrieve the privacy policy that will be enforced onto the query before retrieving the requested information from the customer's personal data store. As explained above, in the process of enforcing the privacy policy onto the queries received in the service requests from the merchant, the customer information manager 12 may perform query rewriting and possibly input/output filtering or other transformations on the queries and the retrieved customer data.

The customer information manager 12 then transmits the retrieved information to the requesting merchant (FIG. 11, block 166). The retrieved information can be transmitted to the merchant in accordance with a secure (i.e., encrypted) transmission process.

With the assigned customer-merchant session identifier and the associated authorization token, each merchant can issue different query requests over the customer-merchant session time period so long as the authorization token has not expired. Depending on the privacy policy specified by the customer, the customer can remain anonymous to each of the merchants because the authorization token does not reveal the customer's identity, and the personal data that is transmitted to the merchants contains only the information allowed by the privacy policy. At the same time, although multiple merchants can share different sets of data extracted from the customer's personal data store, because they do not share the same customer-merchant session identifier and therefore it is very difficult for them to correlate their data sets to the same customer.

Figure 12:
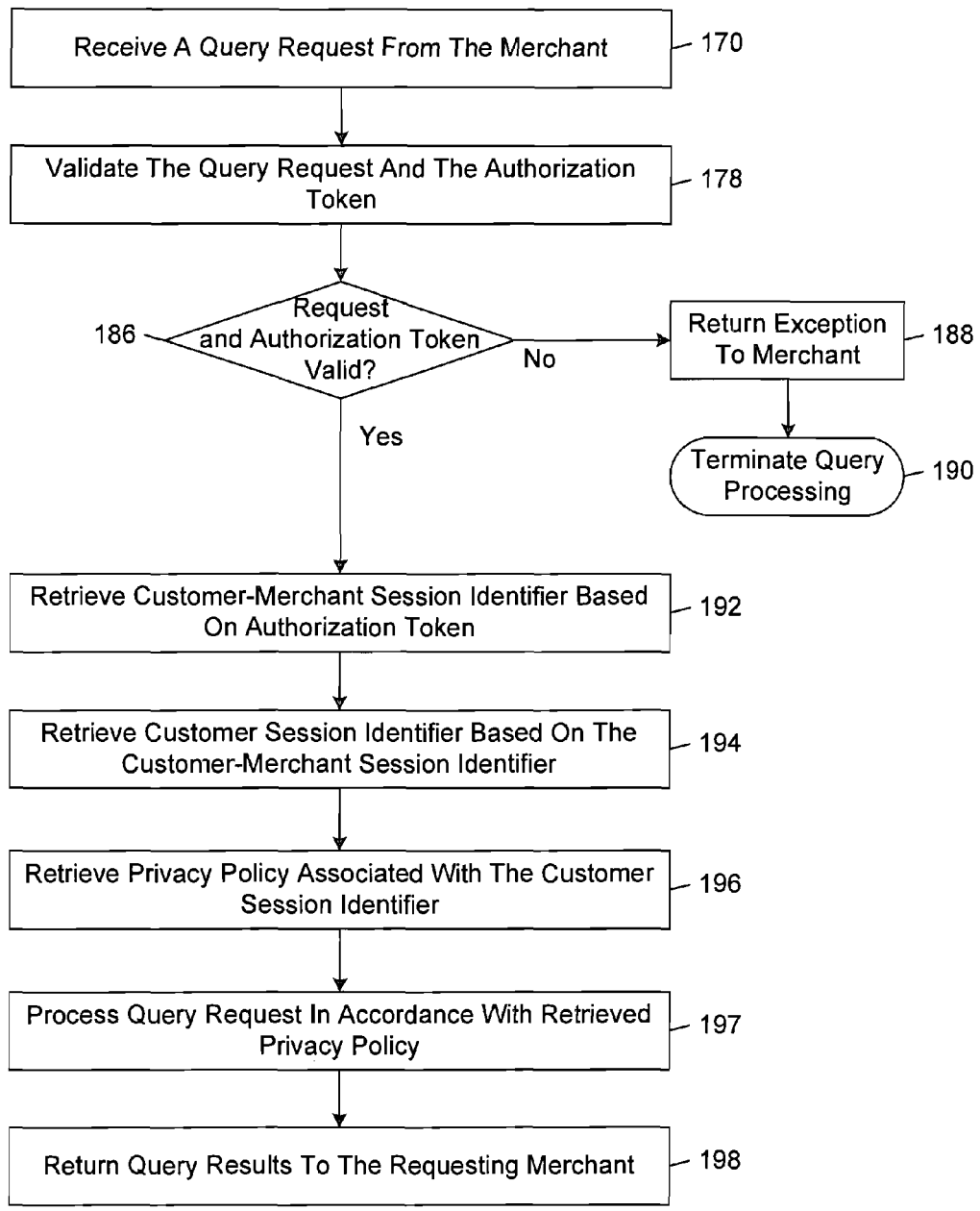
FIG. 12 is a flow diagram of an embodiment of a method processing merchant queries that is implemented by an embodiment of the customer information manager of FIG. 1.
Figure 13:
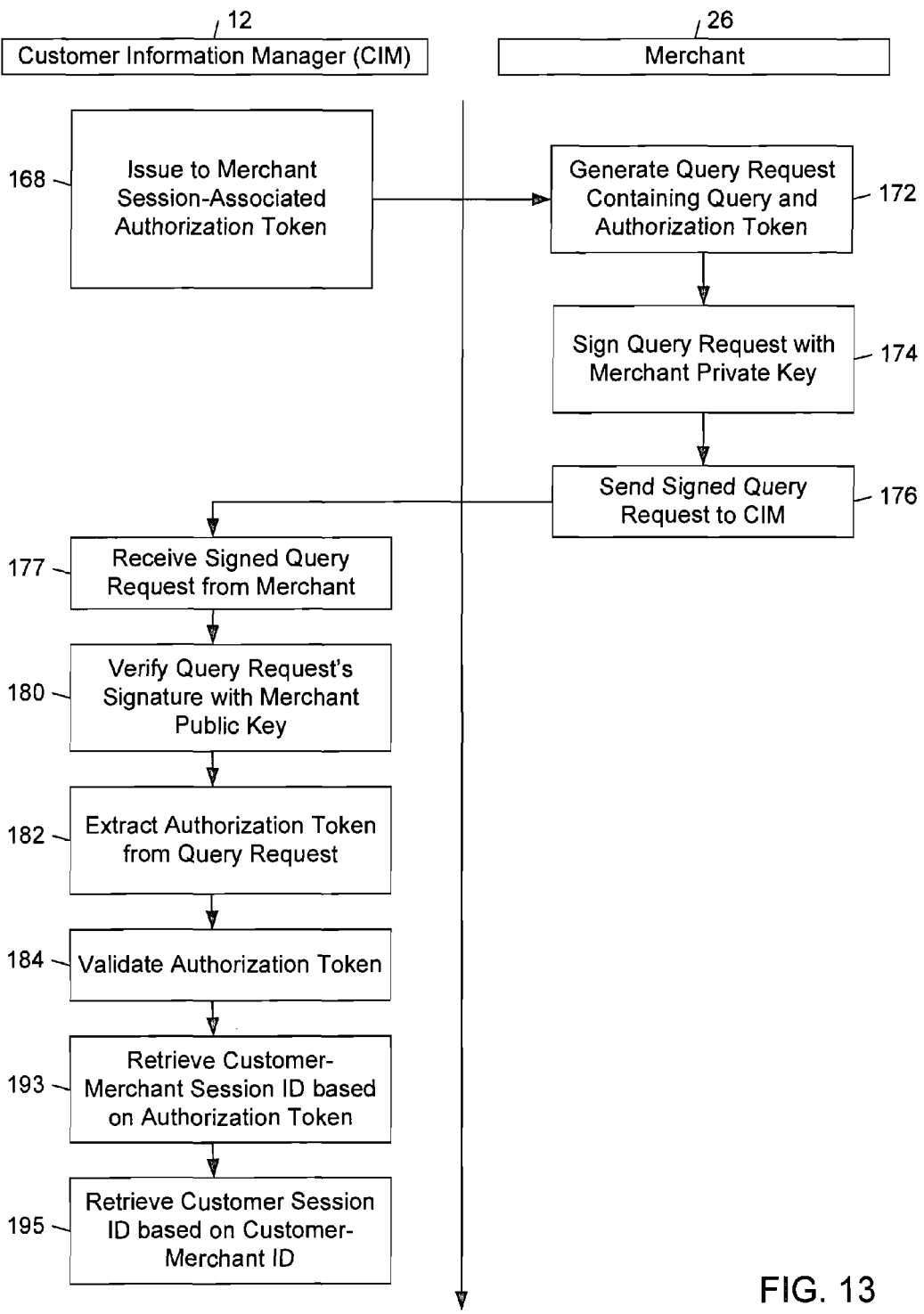
FIG. 13 is a flow diagram that shows the activities of an embodiment of the customer information manager of FIG. 1 and a merchant in accordance with an embodiment of a method of validating queries transmitted from the merchant to the customer information manager.

FIGS. 12 and 13 show an embodiment of the method of FIG. 11. In this embodiment, the authorization token may be a randomly generated character string. The customer information manager 12 issues the authorization token to the merchant (see FIG. 13, block 168), establishing a one-to-one relationship between the authorization token and the customer-merchant session identifier. The customer session identifier and the customer-merchant session identifier are kept as information in the customer information manager.

In accordance with the method of FIG. 12, the customer information manager 12 receives a query request from the merchant 26 (FIG. 12, block 170). The query request contains the authorization token that was issued by the customer information manager 12 (FIG. 13, block 168). In some embodiments, the merchant 26 places the authorization token that it received from the customer information manager in an XML (eXtensible Markup Language) service request document that contains the desired query on the customer's personal data (FIG. 13, block 172). The merchant 26 signs the XML service request document (e.g., using the private key matching the public key certificate given to the customer information manager) (FIG. 13, block 174). The merchant 26 transmits the signed XML service request document to the customer information manager 12 (FIG. 13, block 176). The merchant 26 may transmit the XML service request document using any of a variety of different transport protocols, including but not limited to SOAP (Simple Object Access Protocol) and HTTP (Hyper Text Transfer Protocol). The signed XML service request document typically is embedded in the SOAP or HTTP envelope body.

The customer information manager 12 validates the query request and the authorization token (FIG. 12, block 178). In this process, the customer information manager 12 receives the signed query request from the merchant 26 (FIG. 13, block 177) and validates the signed XML service request document using the merchant's public key (FIG. 13, block 180). The customer information manager 12 also extracts the authorization token from the query request (FIG. 13, block 182), and validates that the authorization token has not been tampered with (e.g., modified) and that the token is not expired and that the token is issued to the merchant by the customer information manager 12 (FIG. 13, block 184).

If the service request or the authorization token is invalid (FIG. 12, block 186), the customer information manager returns an exception to the merchant 26 (FIG. 12, block 188) and terminates the query processing (FIG. 12, block 190).

If the service request and the authorization token are valid (FIG. 12, block 186), the customer information manager 12 uses the authorization token to retrieve the customer-merchant session identifier based on the one-to-one mapping between the authorization token and the customer merchant session identifier (FIG. 12, block 192; FIG. 13, block 193). The customer information manager 12 then uses the customer-merchant session identifier to retrieve the corresponding customer session identifier (FIG. 12, block 194; FIG. 13, block 195). In some embodiments, the customer information manager 12 stores the mapping between the customer-merchant session identifier and the authorization token in a first table, which links the authorization token to the customer-merchant session identifier, and stores the mapping between the customer-merchant session identifier and the customer session identifier in a second table, which links the customer-merchant session identifier to the customer session identifier.

The customer information manager 12 retrieves the privacy policy associated with the customer session identifier from the customer's privacy data 22 (FIG. 1) (FIG. 12, block 196). The customer information manager 12 processes the query request embedded in the XML service request document in accordance with the retrieved privacy policy (FIG. 12, block 197). The customer information manager 12 returns the query results to the requesting merchant (FIG. 12, block 198).

E. Processing Merchant Offers

Figure 14:
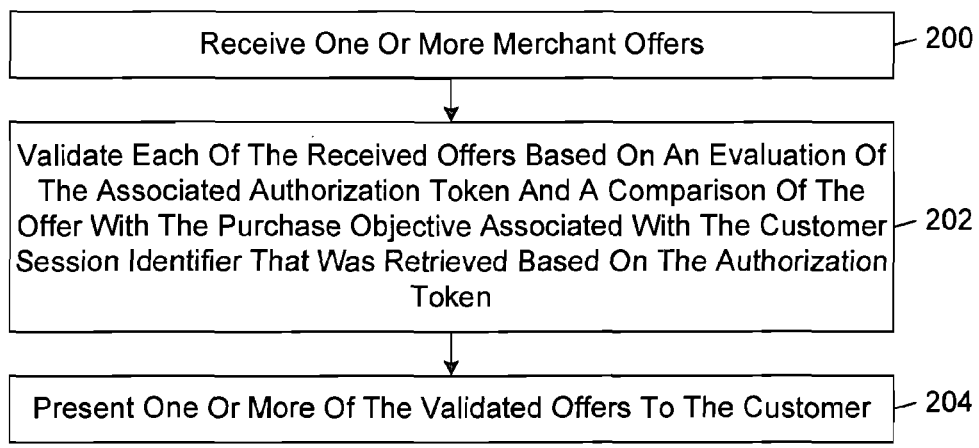
FIG. 14 is a flow diagram of an embodiment of a method of processing merchant offers that is implemented by an embodiment of the customer information manager of FIG. 1.

FIG. 14 shows an embodiment in accordance with which embodiments of the customer information manager 12 processes merchant offers.

In accordance with this embodiment, the customer information manager 12 receives one or more merchant offers (FIG. 14, block 200). Each of the offers is associated with a respective copy of the authorization token that was issued to the corresponding merchant.

The customer information manager 12 validates each of the received offers based on an evaluation of the associated authorization token and a comparison of the offer with the purchase objective associated with the customer session identifier that was retrieved based on the authorization token (FIG. 14, block 202). In this process, the customer information manager 12 ensures that the authorization token is valid (i.e., its integrity has not been compromised and it has not expired and that it is issued by the customer information manager to the merchant that is making the offer) and ensures that the offer complies with the terms of the customer's purchase objective.

The customer information manager 12 presents one or more of the validated offers to the customer 24 (FIG. 14, block 204). In some embodiments, the customer information manager 12 presents all of the offers to the customer 24. In other embodiments, the customer information manager 12 presents only a subset of the validated offers to the customer 24. For example, the customer information manager 12 may present only the best offer or only the top N offers, where N is an integer that may be set to a default value or a value selected by the customer 24.

In response to the received promotional offer, the customer 12 can use the promotional offer to make a purchase, modify the privacy policy associated with the purchase objective, or wait for another offer.

If the customer 24 indicates that he or she wishes to use the promotional offer, the customer information manager 12 can mediate a purchase transaction between the customer 24 and the merchant 26. The customer information manager 12 may facilitate the completion of the purchase transaction by providing ways for the customer 24 to execute the merchant's offer. For example, the customer information manager 12 may allow the customer to print out a copy of the promotional offer that can be used to make an in-store purchase at the merchant's retail establishment. Alternatively, the customer information manager 12 may allow the customer 24 to transmit the pertinent information needed to execute the promotional offer to the merchant's online store. The customer information manager also may broker transactions (e.g., a purchase transaction) between the customer 24 and the merchant 26 to protect the privacy of the customer 24, the merchant 26, or both.

If the customer 24 transmits commands to modify the privacy policy associated with the purchase objective, the customer information manager 12 updates the privacy policy in accordance with the customer's commands. In some embodiments, the customer information manager 12 may notify the merchant 26 that the privacy policy has been changed.

The merchant 26 may wait for the customer 24 to use the promotional offer, modify the promotional offer, or update the customer's profile by sending one or more query requests to the customer information manager 12.

During the customer-merchant session established for a given purchase objective, the customer 24 and the merchant 26 are able to negotiate by means of dynamic adjustments of the customer's privacy policy via modifying the database table 138's "merchant-specific access restriction" column for the rows that correspond to the customer session identifier, and dynamic adjustments of the terms of the merchant's promotional offer. In this way, customer's can trade selective, controlled access to their personal data, which may include purchase history data that spans transactions with multiple vendors, for targeted and potentially higher-valued promotional offers. At the same time, merchants can provide highly targeted promotional offers to customers that have an interest in purchasing their offerings.

V. Conclusion

The embodiments that are described in detail herein are capable of mediating customer-driven exchange of access to personal data for personalized merchant promotional offers. In particular, these embodiments allow customers to solicit targeted promotional offers from merchants that meet their purchase objectives in exchange for allowing merchants to access their personal data in accordance with a privacy policy specified by the customer. Depending on the specified privacy policy, merchant access to a customer's personal data can be controlled in a way that protects the privacy of the customer, while allowing merchants to provide highly targeted promotional offers to customers that have an interest in purchasing their offerings.

Other embodiments are within the scope of the claims.

What is claimed is:

1. A method, comprising computer hardware performing operations comprising:
   receiving a purchase objective from a customer;
   assigning to the purchase objective a respective customer session identifier that uniquely identifies the purchase objective;
   associating the customer session identifier with a privacy policy established by the customer;
   notifying a merchant of the purchase objective;
   receiving from the merchant one or more queries for personal information associated with the customer;
   validating ones of the received queries that are associated with the purchase objective;
   for each of the validated queries,
      retrieving the privacy policy based on the customer session identifier,
      retrieving information matching the query from personal data relating to the customer and comprising historical data relating to prior purchases by the customer from different merchants, subject to data access restrictions specified by the privacy policy established by the customer, wherein the retrieving comprises identifying merchant-specific data access restrictions associated with a merchant identifier identifying the merchant, and applying the identified data access restrictions to the information matching the validated ones of the queries, and
      transmitting the retrieved information to the merchant;
   receiving from the merchant an offer that satisfies the purchase objective; and
   presenting the offer to the customer.

2. The method of claim 1, further comprising prompting the customer to input the description of the purchase objective, wherein the prompting comprises prompting the customer to specify in the purchase objective a promotion to be associated with any merchant offer presented in satisfaction of the purchase objective.

3. The method of claim 1, wherein the notifying comprises sending to the merchant a message comprising an authorization token linked to the customer session identifier.

4. The method of claim 3, wherein the validating comprises verifying that the received queries are associated with respective identifiers that match the authorization token.

5. The method of claim 4, wherein the retrieving comprises determining the customer-merchant identifier from the authorization token, determining the customer session identifier from the customer-merchant session identifier, and retrieving the information matching the one or more queries based on the customer session identifier.

6. The method of claim 1, wherein the notifying comprises sending a message comprising a customer-merchant session identifier linked to the customer session identifier to the merchant over an encrypted communications channel.

7. The method of claim 1, wherein the validating comprises verifying that each of the queries is received from the merchant notified of the purchase objective.

8. The method of claim 1, wherein the retrieving comprises retrieving the matching information from data relating to prior purchases by the customer.

9. The method of claim 1, further comprising classifying the purchase objective into a purchase category selected from a set of predetermined purchase categories, matching the selected purchase category to one of a set of purchase-category-specific privacy policies, and prompting the customer to establish a privacy policy for the purchase objective based on the matched purchase-category-specific privacy policy.

10. The method of claim 1, further comprising brokering a purchase transaction between the customer and the merchant to protect the privacy of at least one of the customer and the merchant.

11. A method, comprising computer hardware performing operations comprising:
    receiving a purchase objective from a customer;
    notifying a merchant of the purchase objective;
    receiving from the merchant one or more queries for personal information associated with the customer;
    validating ones of the received queries that are associated with the purchase objective, wherein the validating comprises invalidating those queries that are received outside a finite customer-merchant session time period;
    for each of the validated queries, retrieving information matching the query from personal data relating to the customer subject to data access restrictions specified by a privacy policy established by the customer, and transmitting the retrieved information to the merchant;
    receiving from the merchant an offer that satisfies the purchase objective; and
    presenting the offer to the customer.

12. The method of claim 11, further comprising dynamically updating the privacy policy in response to a request from the customer to modify the privacy policy, wherein the retrieving comprises retrieving the matching information subject to data access restrictions specified by the updated privacy policy in response to validated queries received during the customer-merchant session time period and after the privacy policy was updated.

13. The method of claim 11, further comprising issuing to the merchant an authorization token that is valid only during the customer-merchant session time period, wherein the validating comprises declaring as valid only those queries that are accompanied by a valid copy of the authorization token.

* * * * *